(12) United States Patent
Tachibana

(10) Patent No.: US 6,210,002 B1
(45) Date of Patent: Apr. 3, 2001

(54) LENS HOLDING MECHANISM OF SPECTACLES

(76) Inventor: Hideaki Tachibana, 10-15, Sanrokucho 1-chome, Sabae-shi, Fukui 916-0021 (JP)

( * ) Notice: Subject to any disclaimer, the term of this patent is extended or adjusted under 35 U.S.C. 154(b) by 0 days.

(21) Appl. No.: 09/587,247

(22) Filed: Jun. 5, 2000

(30) Foreign Application Priority Data

Jun. 14, 1999 (JP) .................................................. 11-166267

(51) Int. Cl.[7] ...................................................... G02C 1/04
(52) U.S. Cl. .............................................. 351/110; 351/41
(58) Field of Search ............................... 351/110, 41, 86, 351/83, 106, 103, 108, 109

(56) References Cited

U.S. PATENT DOCUMENTS 6,024,445 * 2/2000 Conner et al. ........................ 351/110

* cited by examiner

*Primary Examiner*—Hung Xuan Dang
(74) *Attorney, Agent, or Firm*—Ronald R. Snider; Snider & Associates

(57) ABSTRACT

A lens holding mechanism of spectacles with an extremely simple structure is provided, which mechanism nonetheless enables the respective lenses to be securely clamped. The respective lenses are held onto the respective endpieces or the bridge by abutting an elastically deformable holding member having a receiving portion with a first corresponding hole provided therethrough and an abutment portion with a second corresponding hole provided therethrough onto the lens surface and tightly inserting a first inserting pin of a joint member mounted onto the respective endpieces or the bridge into a holding aperture provided in the vicinity of the circumferential fringe side of the respective lenses so as to be tightly received into the first corresponding hole while at the same time by tightly inserting the second inserting pin into the second corresponding hole. In spite of such an extremely simple structure, the reliable lens clamping is assured.

9 Claims, 4 Drawing Sheets

LENS HOLDING MECHANISM OF SPECTACLES

RELATED APPLICATION

The present application claims the priority of the Japanese Patent Application No. 11-166267 filed on Jun. 14, 1999.

BACKGROUND OF THE INVENTION

1. Technical Field

The present invention relates to a lens holding mechanism of spectacles, in more details, to such mechanism having an extremely simple structure that the respective lenses can be securely clamped without using a screw.

2. Prior Art

Recently, a pair of spectacles, which is wide in vision and light in weight, and shapely in form, is popular among the wearers in general, and particularly a so-called "rimless spectacles" is the most popular among them, which does not require a rim enclosing the lenses because the bridge portion symmetrically connecting a pair of lenses as well as the endpiece portions foldably hinging the temples are directly screwed onto holding apertures opened in the vicinity of the fringe sides of the lenses.

However, such prior rimless spectacles was found inconvenient in use because the clamping portions of the lenses at such holding apertures become fluctuated in no time due to the loosening of a screw or wear on the lens holes. That is to say, conventionally, the lens holding has been secured by providing a supporting piece on the bridge and endpieces to be screwed onto the lenses, and abutting such member on the side surface of the lens, thereby, preventing the rotational displacement of the clamping portions. As such rimless spectacles is very simple in structure, the bridge and endpieces thereof become susceptible to deformation under external forces, with the result that the abutment of the supporting piece to the lens side surface becomes insufficient to bring the lens holding portions into an unstable condition or fluctuation.

Nowadays, the tendency for the users, who are not satisfied with the state of the art, to demand further simplification in design and structure of the rimless spectacles, especially of the lens clamping portions thereof, has further led them to complain of the intervention of such supporting piece and demand that it should be gotten rid of.

Thus, the present invention is to provide a lens holding mechanism of spectacles having such an extremely simple structure that it can dispense with a screw so as to allow further simplification in design, which nevertheless enables the respective lenses to be clamped without fluctuation.

Further, the present invention is to provide a lens holding mechanism for spectacles which is also applicable to prescription eyeglasses, the thickness and rear-side surface curvature of which change according to the degree of vision correction to be required.

DISCLOSURE OF THE INVENTION

In order to securely hold the respective lenses into place without involving any intricate structure therefor, the respective lenses are held to the respective endpieces or both ends of the bridge by abutting a holding member comprising a receiving portion having a first corresponding hole and an abutment portion having a second corresponding hole onto the respective lenses, in the vicinity of the circumferential fringe portion of which a holding aperture is provided, and by inserting a first inserting pin of a joint member mounted onto the respective endpieces or both ends of the bridge into the holding aperture so as to be tightly received into said first corresponding hole via the holding aperture while at the same time by tightly inserting a second inserting pin of said joint member into said second corresponding hole.

BEST MODE FOR CARRYING OUT THE INVENTION

Hereinafter, the lens holding mechanism of spectacles according to the present invention is in more details explained as follows with reference to the accompanying drawings.

(First Embodiment)

Figure 1:
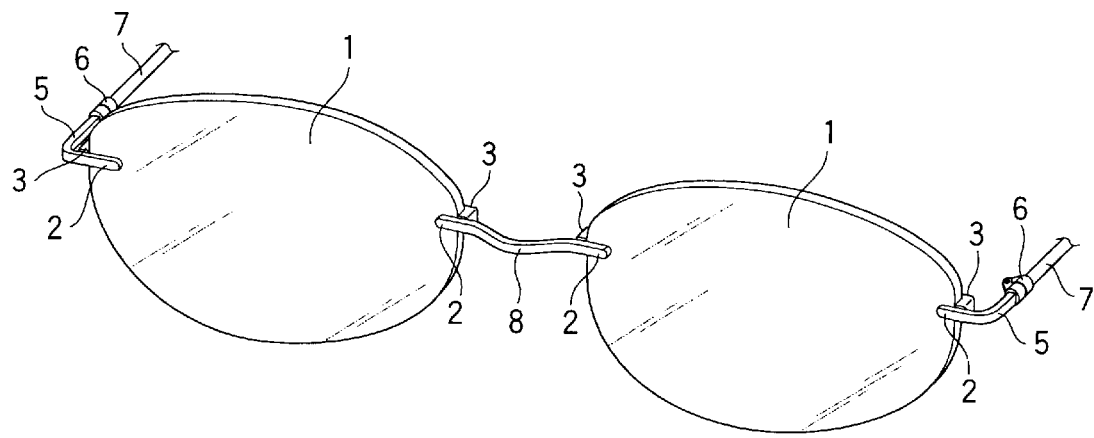
FIG. 1 is a partly perspective view of rimless spectacles assembled by adopting the lens holding mechanism of the first embodiment.
Figure 2:
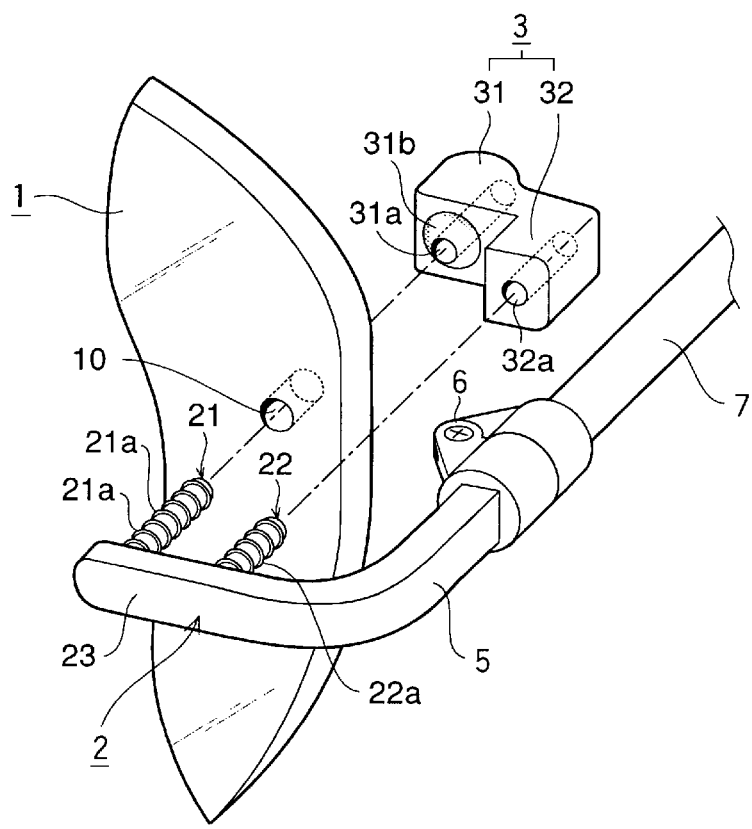
FIG. 2 is an exploded perspective view of rimless spectacles showing the lens holding mechanism of the first embodiment.

As shown in FIG. 1, the lens holding mechanism embodied in the present invention is intended to securely hold the respective endpieces (5) and (5), to which the respective temples (7) are foldably engaged through a hinge (6), onto the outer fringe side of the respective lenses (1) and (1) and to securely hold a bridge (8) suspending a nose pad, which is not shown in the drawings, onto the inner fringe side of the respective lenses (1) and (1).

In the drawing, the reference number (1) indicates a lens made of synthetic resin, in the vicinity of the outer and inner fringe sides thereof respectively, a holding aperture (10) being bored through.

The reference number (2) indicates a metallic joint member integrally mounted onto a contra-lens portion of the respective endpieces and such portion at both ends of the bridge. The joint member (2) of this embodiment comprises a first inserting pin (21) and a second inserting pin (22) which are aligned in parallel, and a connecting portion (23) to engage those pins. There are a number of projections (21a) formed on the circumference of the first pin while on that of the second pin there are a number of projections (22a) formed.

In the drawing, the reference number (3) indicates an elastically deformable holding member made of synthetic resin, as shown, said member being formed substantially in the letter "L" and comprising a receiving portion (31) to be opposedly disposed to the rear-side surface of the respective lenses and an abutment portion (32) formed extensibly from said receiving portion so as to be abutted onto the side surface of the respective lenses. A first corresponding hole (31a) to tightly receive said first pin is bored through said receiving portion (31) while in said abutment portion (32) a second corresponding hole (32a) to tightly receive said second pin being opened through. It is noted that the reference number (31b) in the drawing indicates a projection guide formed substantially in a semi-spherical figure at the contra-lens periphery of the first corresponding hole (31a), which enhances the fitness of the receiving portion to the holding aperture (10) provided on a prescription lens, the rear-side curvature of which changes according to the degree of vision correction to be required.

Figure 3:
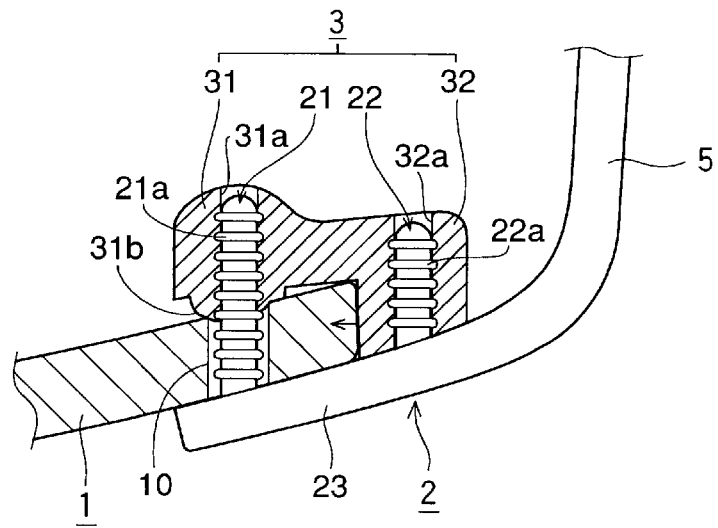
FIG. 3 is a partly sectional view of rimless spectacles showing the lens holding mechanism of the first embodiment.

In the lens holding mechanism as described above, as shown in FIG. 3, the respective lenses are held onto the respective endpieces (5) and the bridge (8) by disposing said receiving portions (31) opposedly to the rear side of the respective lenses with the first corresponding holes (31a) coincided with the holding apertures (10) while at the same time by abutting said abutment portions (32) onto the fringe side of the respective lenses and then by inserting the first pins (21) into the holding apertures so as to be tightly received into the first corresponding holes (31a) while at the same time by tightly inserting the second inserting pins (22) into the second corresponding holes (32a).

With the lens holding mechanism of this embodiment, the lenses can be secured in place just by tightly inserting the first and second inserting pins (21) and (22) through their projections (21a) and (22a) into the first and second corresponding holes (31a) and (32a), so that it is not required any longer to provide a supporting piece, which is abutted onto the fringe side of the respective lenses, on the respective endpieces and bridge as in the case of the prior arts, which leads to the simplification of such mechanism. Also, the riddance of a screw to clamp the lenses enables them to be secured in place for a longer time and set free from fluctuation due to vibration and so on.

Moreover, when the second inserting pin (22) is tightly inserted into the second corresponding hole (32a), as the latter is compressedly deformed with the former and its projections (22a) so as to expand outwards, this deformation makes a lens contact side surface of said abutment portion (32) press the fringe side of the lens, so that this portion elastically attaches onto the fringe side thereof. Accordingly, the abutment portion through its second corresponding hole securely receives the second inserting pin (22) while at the same time the lens contact side surface thereof urges the fringe side of the lens to elastically hold the latter, so that there is no case here as in the prior arts where the deformation of the bridge or endpieces brings the abutment of the supporting pieces to the fringe side of the respective lenses into unstable condition, leading to the fluctuation of the lens clamping portions.

The first embodiment of the present invention has been substantially described up to here, but it is not limited to the above disclosure, which can be modified in various manners within the scope of the accompanying patent claims.

Figure 4:
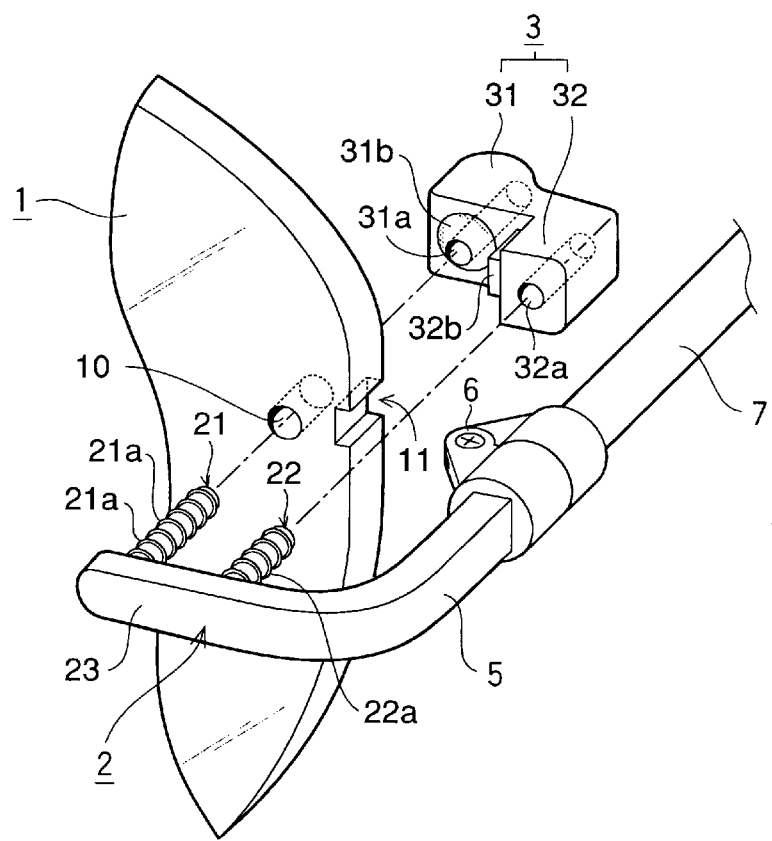
FIG. 4 is an exploded perspective view of rimless spectacles showing a modified example of the first embodiment.

For example, as shown in FIG. 4, providing that a concave portion (11) is transversely notched on the side surface of the lens while a convex portion (32b) projecting towards the fringe side of the lens is provided on the abutment portion so as to mount the latter portion onto the former portion upon clamping the lenses into place, it realizes more stable and secure lens clamping condition synergistically with the compression against the fringe side of the lens by the abutment portion (32) as mentioned above. Of course, this modified example is also applicable to the following second and third embodiments.

Furthermore, in the above first embodiment, although a plurality of circular projections (21a) and (22a) are formed in the circumferential surface of the first inserting pin (21) and the second inserting pin (22) respectively, the present invention is not limited to this disclosure. The number of those projections and their configurations and so on allow for various modifications in view of how tightly they should be inserted into the corresponding holes (31a) and (32a). Provided that the first and second inserting pins (21) and (22) are tightly insertable into the corresponding holes (31a) and (32a) respectively by making the diameter of the respective pins larger than the inner bore of the respective holes (31a) and (32a), it does not matter whether those projections (21a) and (22a) are formed on the circumferential surface of the first and second pins respectively. This modification is also applicable to the following second and third embodiments.

(Second Embodiment)

Figure 5:
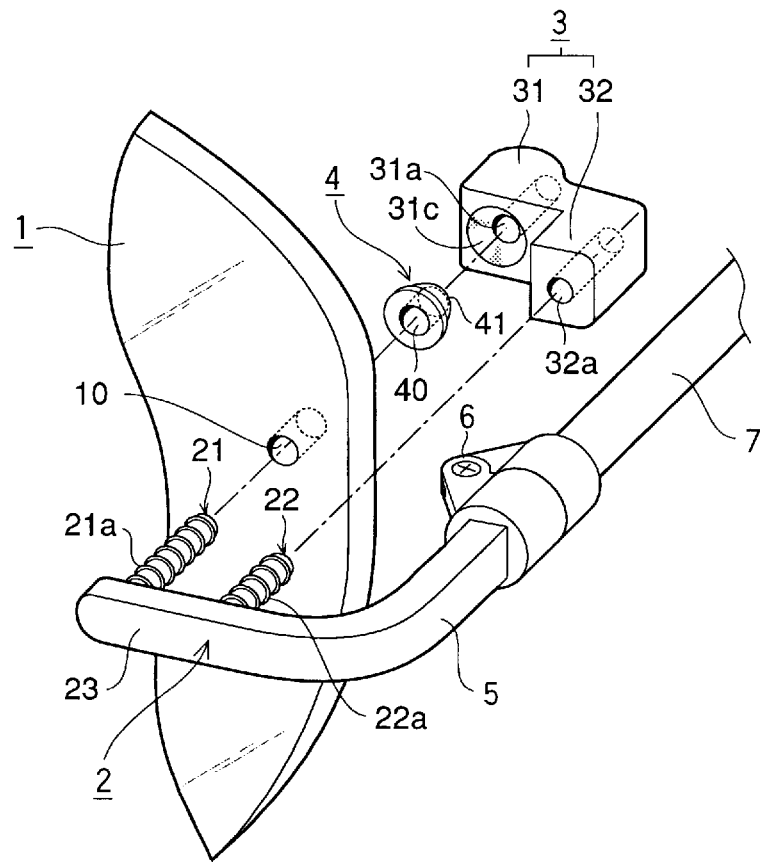
FIG. 5 is an exploded perspective view of rimless spectacles assembled in accordance with the lens holding mechanism of the second embodiment.

The lens holding mechanism of the second embodiment is described as follows with reference to FIGS. 5 and 6. The mechanism as described below is characterized in that a washer intervenes between the receiving portion (31) of the holding member (3) and the respective lenses. Except for this characteristic portion, structurally speaking, this embodiment is the same as the first embodiment, and has the same effect as brought by the first embodiment.

In the drawings, reference number (4) indicates a washer, which is formed of elastically deformable synthetic resin and provided with a semi-spherical head portion (41), and through which a hole (40) is opened such that the first inserting pin (21) of the joint member (2) is unforcedly insertable therein. This head portion is arranged such that it is rotatably insertable into a recess portion (31c) formed on the receiving portion (31) of the holding member (3).

Figure 6:
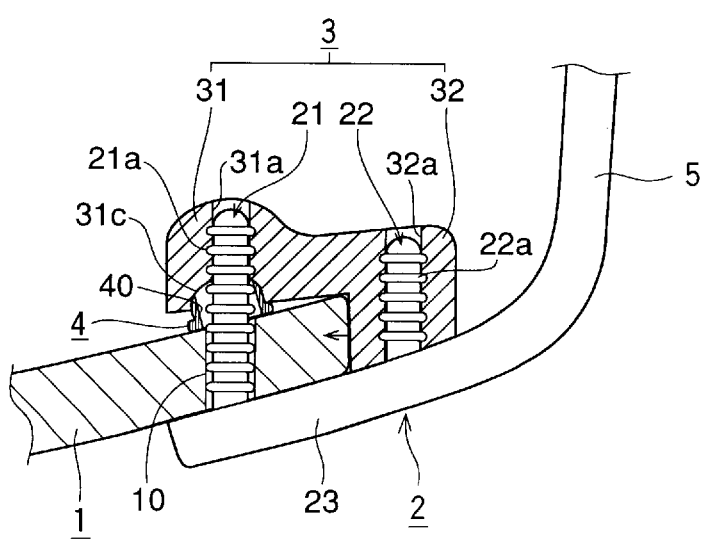
FIG. 6 is a partly sectional view of rimless spectacles showing the lens holding mechanism of the second embodiment.

With the lens holding mechanism of this embodiment, as shown in FIG. 6, the respective lenses (1) are held onto the endpieces (5) and the bridge (8) by coinciding the first corresponding holes (31a) of the holding members (3) with the making position of the holding apertures (10) of the respective lenses so as to dispose the receiving portions (31) opposedly to the rear side of the respective lenses through washers (4) while at the same time by abutting the abutment portions (32) thereof onto the fringe side of the respective lenses and then by inserting the first inserting pins (21) of the joint members (2) into the holding apertures (10) and the holes (40) of the washers (4) so as to be tightly received into the first corresponding holes (31a) while at the same time by tightly inserting the second inserting pins (22) into the second corresponding holes (32a).

As described above, with the holding mechanism of this embodiment, as the washer (4) intervenes between the respective lenses and the receiving portion (31), as shown in FIG. 6, this washer elastically deforms along the rear-side surface of the respective lenses upon clamping them into place so as to closely abut that surface, so that the fitness of the receiving portion (31) i.e. holding member to the holding aperture (10) especially of the prescription glasses, the rear-side surface curvature of which changes according to the degree of vision correction, improves, with the result that the respective lenses can be more securely and stably held into place. Having a plurality of washers different in size and configuration in stock, it makes it possible to securely hold a pair of prescription glasses, the rear-side surface curvature and thickness of which are different according to the degree of vision correction, into place just by replacing one washer with another.

(Third Embodiment)

Then, the lens holding mechanism of this embodiment is described as follows with reference to FIGS. 7 and 8. This embodiment is characterized in that a sleeve (33) is protrusively provided on the receiving portion (31) of the holding member (3), which sleeve is insertbale into the holding aperture (10) of the respective lenses. Except for this characteristic portion, structurally speaking, the other elements are the same as the first embodiment, and has the same effect as brought by the first embodiment.

Figure 7:
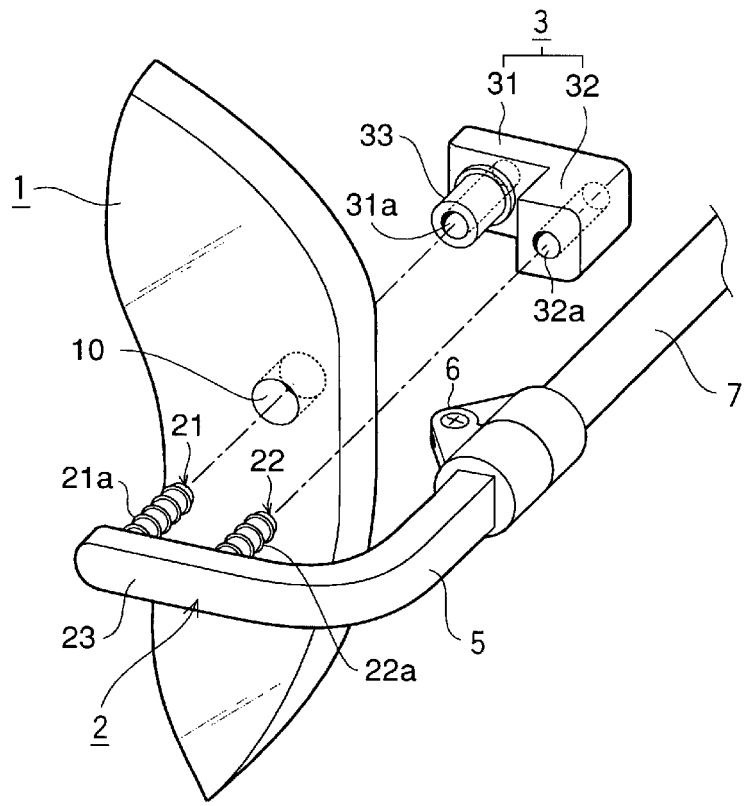
FIG. 7 is an exploded perspective view of rimless spectacles showing the lens holding mechanism of the third embodiment.

As shown in FIG. 7, a sleeve (33) is provided on the receiving portion (31) of the holding member (3), which sleeve protrudes towards the respective lenses and is insertable into the holding aperture (10) thereof, and through which a first corresponding hole (31a) to tightly receive the first inserting pin (21) of the joint member (2) is bored.

Figure 8:
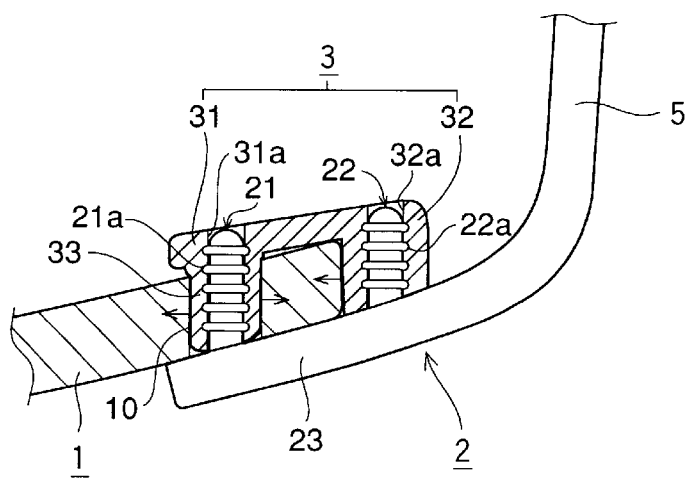
FIG. 8 is a partly sectional view of rimless spectacles showing the lens holding mechanism of the third embodiment.

In this embodiment, as shown in FIG. 8, the respective lenses are held onto the respective endpieces (5) and the bridge (8) by inserting the sleeves (3) of the holding members (3) into the holding apertures (10) of the respective lenses so as to dispose the receiving portions (31) thereof oppositely to the rear-side surface of the respective lenses while at the same time by abutting the abutment portions (32) onto the side surface thereof and then by tightly inserting the first inserting pins (21) into the first corresponding holes (31a) while at the same time by tightly inserting the second inserting pins (22) into the second corresponding holes (32a).

In this embodiment, as the first inserting pin (21) is tightly inserted into the first corresponding hole (31a) of the sleeve (33) which is preliminarily inserted into the holding aperture (10) of the respective lenses, as shown in FIG. 8, the hole (31a) is compressed to expand by the first inserting pin and its projections (21a), which expansion causes the outer circumferential surface of the sleeve to press against the inner circumferential surface of the holding aperture (10), so that the sleeve elastically attaches onto the holding aperture. The sleeve's compression behavior against the holding aperture together with the abutment portion's compression behavior against the side surface of the respective lenses brings the respective lenses into a far more stable clamping condition.

According to this embodiment, the first inserting pins are tightly insertable into the first corresponding holes (31a) of the sleeves (3), so that it is not required to bulge the ocular-side surface of the receiving portion (31) so much as to allow for the first corresponding hole (31a) as in the above second and third embodiments, which enables the receiving portion (31) to be unremarkably formed, with the result that it can provide a lens holding mechanism whose receiving portion (31) in abutment with the rear-side surface of the respective lenses is shapely in design.

What is claimed is:

1. A lens holding mechanism of spectacles comprising:
a pair of lenses (1), said respective lenses having a holding aperture (10) provided in the vicinity of the circumferential fringe side thereof;
a joint member (2) mounted onto a contra-lens portion of each endpiece (5) or a bridge (8), said member being provided with a first inserting pin (21) and a second inserting pin (22) which are aligned in parallel;
an elastically deformable holding member (3) having a receiving portion (31) through which a first corresponding hole (31a) is provided to tightly receive said first inserting pin (21) therein and is disposed oppositely to one of the frontal and rear surfaces of the respective lenses with said first corresponding hole coincided with the making position of the holding aperture (10) and an abutment portion (32) which is formed extensibly from said receiving portion such that it abuts the side surface of the respective lenses and through which a second corresponding hole (32a) is provided to tightly receive said second inserting pin (22) therein,
wherein the respective lenses are held onto the respective endpieces (5) or the bridge (8) by oppositely disposing said receiving portions (31) to one of the frontal and rear surfaces of the respective lenses while at the same time by abutting said abutment portions (32) onto the side surface of the respective lenses and inserting said first inserting pins (21) into the holding apertures (10) so as to be tightly received into said first corresponding holes (31a) while at the same time by tightly inserting the second inserting pins (22) into the second corresponding holes (32a).

2. A lens holding mechanism of spectacles according to claim 1 wherein a concave portion (11) is formed on the side surface of the respective lenses while a convex portion (32b) mountable into said concave portion is provided on the abutment portion (32).

3. A lens holding mechanism of spectacles according to claim 1 wherein at least one projection (21a) and (22a) is provided in the circumferential surface of the first inserting pin and the second inserting pin (21) and (22) respectively.

4. A lens holding mechanism of spectacles comprising:
a pair of lenses (1), said respective lenses having a holding aperture (10) provided in the vicinity of the circumferential fringe side thereof;
a joint member (2) mounted onto a contra-lens portion of each endpiece (5) or a bridge (8), said member being provided with a first inserting pin (21) and a second inserting pin (22) which are aligned in parallel;
an elastically deformable holding member (3) having a receiving portion (31) through which a first corresponding hole (31a) is provided to tightly receive said first inserting pin (21) therein and is disposed oppositely to one of the frontal and rear surfaces of the respective lenses with said first corresponding hole coincided with the making position of the holding aperture (10) and an abutment portion (32) which is formed extensibly from said receiving portion such that it abuts the side surface of the respective lenses and through which a second corresponding hole (32a) is provided to tightly receive said second inserting pin (22) therein;
a washer (4) with a hole (40) opened therethrough, into which hole the first inserting pin (21) is insertable,
wherein the respective lenses are held onto the respective endpieces (5) or the bridge (8) by oppositely disposing said receiving portions (31) via said washers (4) to one of the frontal and rear surfaces of the respective lenses while at the same time by abutting said abutment portions (32) onto the side surface of the respective lenses and tightly inserting said first inserting pins (21) into the holding apertures (10) and holes (40) so as to be tightly received into said first corresponding holes (31a) while at the same time by tightly inserting the second inserting pins (22) into the second corresponding holes (32a).

5. A lens holding mechanism of spectacles according to claim 4 wherein a concave portion (11) is formed on the side surface of the respective lenses while a convex portion (32b) mountable into said concave portion is provided on the abutment portion (32).

6. A lens holding mechanism of spectacles according to claim 4 wherein at least one projection (21a) and (22a) is provided in the circumferential surface of the first inserting pin and the second inserting pin (21) and (22) respectively.

7. A lens holding mechanism of spectacles comprising:
- a pair of lenses (1), said respective lenses having a holding aperture (10) provided in the vicinity of the circumferential fringe side thereof;
- a joint member (2) mounted onto a contra-lens portion of each endpiece (5) or a bridge (8), said member being provided with a first inserting pin (21) and a second inserting pin (22) which are aligned in parallel;
- an elastically deformable holding member (3) having a receiving portion (31) which is provided with a protrusive sleeve (33) having a first corresponding hole (31a) to tightly receive said first inserting pin (21) therein and is disposed opposedly to one of the frontal and rear surfaces of the respective lenses with said sleeve inserted into the holding aperture (10) and an abutment portion (32) which is formed extensibly from said receiving portion such that it abuts the side surface of the respective lenses and is provided with a second corresponding hole (32a) to tightly receive said second inserting pin (22) therein, wherein the respective lenses are held onto the respective endpieces (5) or the bridge (8) by inserting said sleeves into the holding apertures so as to opposedly dispose said receiving portions (31) to one of the frontal and rear surfaces of the respective lenses while at the same time by abutting said abutment portions (32) onto the side surface of the respective lenses and tightly inserting said first inserting pins (21) into the first corresponding holes (31a) of the sleeves (33) while at the same time by tightly inserting the second inserting pins (22) into the second corresponding holes (32a).

8. A lens holding mechanism of spectacles according to claim 7 wherein a concave portion (11) is formed on the side surface of the respective lenses while a convex portion (32b) mountable into said concave portion is provided on the abutment portion (32).

9. A lens holding mechanism of spectacles according to claim 7 wherein at least one projection (21a) and (22a) is provided in the circumferential surface of the first inserting pin and the second inserting pin (21) and (22) respectively.

* * * * *